(12) United States Patent
Kaufman

(10) Patent No.: US 9,219,818 B2
(45) Date of Patent: *Dec. 22, 2015

(54) FOLLOWUP OF CUSTOMER SERVICE AGENTS

(71) Applicant: Amazon Technologies, Inc., Seattle, WA (US)

(72) Inventor: Donald L. Kaufman, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/624,330

(22) Filed: Feb. 17, 2015

(65) Prior Publication Data

US 2015/0195407 A1    Jul. 9, 2015

Related U.S. Application Data

(63) Continuation of application No. 12/980,259, filed on Dec. 28, 2010, now Pat. No. 8,958,542.

(51) Int. Cl.
*H04M 3/00* (2006.01)
*H04M 3/523* (2006.01)
*H04M 3/51* (2006.01)

(52) U.S. Cl.
CPC .............. *H04M 3/5231* (2013.01); *H04M 3/00* (2013.01); *H04M 3/5191* (2013.01); *H04M 3/5235* (2013.01); *H04M 3/5238* (2013.01)

(58) Field of Classification Search
CPC .................... H04M 3/382; H04M 2203/2011; H04M 2203/6018

USPC .......... 379/265.01, 265.02, 265.04, 265.05, 379/265.06, 265.09, 265.11, 265.12, 379/265.13, 265.14, 266.01, 266.06, 266.09

See application file for complete search history.

(56) References Cited

U.S. PATENT DOCUMENTS

| | | |
|---|---|---|
| 5,825,870 A | 10/1998 | Miloslavsky |
| 6,389,132 B1 | 5/2002 | Price |
| 6,408,066 B1 | 6/2002 | Andruska et al. |
| 6,424,709 B1 | 7/2002 | Doyle et al. |
| 6,487,290 B1 | 11/2002 | Le Grand |

(Continued)

FOREIGN PATENT DOCUMENTS

| | | |
|---|---|---|
| JP | 10-262117 | 9/1998 |
| JP | 11-112666 | 4/1999 |

(Continued)

OTHER PUBLICATIONS

U.S. Appl. No. 14/805,352, filed Jul. 21, 2015, Dashe et al.

*Primary Examiner* — Antim Shah
(74) *Attorney, Agent, or Firm* — Knobbe Martens Olson & Bear, LLP (57) ABSTRACT

A user of a personal computing device may identify an item of interest displayed in a user interface provided by a network-based service and would like to obtain more information. The user may submit an electronic contact requests to an agent continuity service in communication with one or more service agents in order to obtain more information. The agent continuity service may determine whether the user has communicated with an agent previously and, if so, provide the user with the option to communicate with the agent again, should the user desire.

20 Claims, 7 Drawing Sheets

(56) References Cited

U.S. PATENT DOCUMENTS

| | | |
|---|---|---|
| 6,512,825 B1 | 1/2003 | Lindholm et al. |
| 6,731,393 B1 | 5/2004 | Currans et al. |
| 6,798,877 B2 | 9/2004 | Johnson et al. |
| 6,826,194 B1 | 11/2004 | Vered et al. |
| 7,085,366 B2 | 8/2006 | O'Neil |
| 7,092,509 B1 | 8/2006 | Mears et al. |
| 7,149,747 B1 | 12/2006 | Cheng et al. |
| 7,158,628 B2 | 1/2007 | McConnell et al. |
| 7,184,540 B2 | 2/2007 | Dezonno et al. |
| 7,581,230 B2 | 8/2009 | Chen et al. |
| 7,706,521 B2 | 4/2010 | Gavagni et al. |
| 7,925,001 B2 | 4/2011 | Knight, Jr. et al. |
| 7,949,999 B1 | 5/2011 | Willeford et al. |
| 7,958,518 B1 | 6/2011 | Willeford et al. |
| 8,046,309 B2 | 10/2011 | Evans et al. |
| 8,249,245 B2 | 8/2012 | Jay et al. |
| 8,340,275 B1 | 12/2012 | Brandwine et al. |
| 8,503,664 B1 | 8/2013 | Kaufman |
| 8,542,816 B2 | 9/2013 | Kaufman et al. |
| 8,600,035 B2 | 12/2013 | Jay et al. |
| 8,666,929 B2 | 3/2014 | Jaffer et al. |
| 8,848,898 B2 | 9/2014 | Jay et al. |
| 8,873,735 B1 | 10/2014 | Brandwine et al. |
| 8,879,717 B2 | 11/2014 | Jay et al. |
| 8,958,542 B1 * | 2/2015 | Kaufman ................ 379/265.11 |
| 8,983,055 B1 | 3/2015 | Kaufman |
| 9,088,649 B2 | 7/2015 | Dashe et al. |
| 2001/0014143 A1 | 8/2001 | Kuhn |
| 2001/0054064 A1 | 12/2001 | Kannan |
| 2002/0196927 A1 | 12/2002 | Johnson et al. |
| 2002/0196928 A1 * | 12/2002 | Johnson et al. .......... 379/266.01 |
| 2003/0169870 A1 | 9/2003 | Stanford, |
| 2003/0220866 A1 | 11/2003 | Pisaris-Henderson et al. |
| 2004/0186778 A1 | 9/2004 | Margiloff et al. |
| 2005/0071241 A1 | 3/2005 | Flockhart et al. |
| 2005/0111653 A1 | 5/2005 | Joyce et al. |
| 2006/0143058 A1 | 6/2006 | Brunet et al. |
| 2006/0198504 A1 | 9/2006 | Shemisa et al. |
| 2006/0203993 A1 | 9/2006 | Busey et al. |
| 2007/0160188 A1 | 7/2007 | Sharpe et al. |
| 2007/0201684 A1 | 8/2007 | Boghani |
| 2007/0208590 A1 | 9/2007 | Dorricott et al. |
| 2007/0274489 A1 | 11/2007 | Yamamura et al. |
| 2007/0286180 A1 | 12/2007 | Marquette et al. |
| 2008/0034354 A1 | 2/2008 | Brughton et al. |
| 2008/0082341 A1 | 4/2008 | Blair |
| 2008/0084989 A1 | 4/2008 | Dhanakshirur |
| 2008/0147470 A1 | 6/2008 | Johri et al. |
| 2008/0247525 A1 | 10/2008 | LeBlanc et al. |
| 2008/0288349 A1 | 11/2008 | Weisberg et al. |
| 2009/0122973 A1 * | 5/2009 | Jay et al. .................. 379/266.01 |
| 2009/0156178 A1 | 6/2009 | Elsey et al. |
| 2009/0228493 A1 | 9/2009 | Kephart et al. |
| 2009/0261157 A1 | 10/2009 | Kumar et al. |
| 2009/0316687 A1 | 12/2009 | Kruppa |
| 2010/0131382 A1 | 5/2010 | Fitzsimmons |
| 2010/0281398 A1 | 11/2010 | Melideo |
| 2011/0066498 A1 | 3/2011 | Wojcicki et al. |
| 2011/0087548 A1 | 4/2011 | Schauser et al. |
| 2011/0286444 A1 | 11/2011 | Petrovykh |
| 2011/0310891 A1 | 12/2011 | Howe et al. |
| 2011/0320200 A1 | 12/2011 | Broman et al. |
| 2012/0101865 A1 | 4/2012 | Zhakov |
| 2015/0023490 A1 | 1/2015 | Jay |
| 2015/0172466 A1 | 6/2015 | Kaufman |

FOREIGN PATENT DOCUMENTS

| | | |
|---|---|---|
| JP | 2002-033834 | 1/2002 |
| JP | 2002-57801 | 2/2002 |
| JP | 2002-108794 | 4/2002 |
| JP | 2002-314691 | 10/2002 |
| JP | 2003-022382 | 1/2003 |
| JP | 2003-87411 | 3/2003 |
| JP | 2003-99319 | 4/2003 |
| JP | 2003-122890 | 4/2003 |
| JP | 2004-343220 | 12/2004 |
| JP | 2007-265325 | 10/2007 |
| JP | 2007-304985 | 11/2007 |
| JP | 2008-172487 | 7/2008 |
| JP | 2008-182353 | 8/2008 |
| WO | WO 98/01987 | 1/1998 |

* cited by examiner

FOLLOWUP OF CUSTOMER SERVICE AGENTS

CROSS-REFERENCE TO RELATED APPLICATIONS

This application is a continuation of U.S. application Ser. No. 12/980,259, filed Dec. 28, 2010, now U.S. Pat. No. 8,958,542, which is expressly incorporated by reference in its entirety.

BACKGROUND

In an increasingly networked society, users frequently use data networks to perform a variety of tasks formerly performed in person. For example, a user may purchase an item from a network-based retailer using his or her computing device. In yet another example, the user may employ a banking service to check account balances, pay bills, schedule transfers, and the like. As a result, providers of network-based services face a number of pre- and post-sale contacts with their customers. Systems, such as call centers have been developed as a centralized, scalable mechanism to handle the volume of calls across a variety of contact contexts, including, for example, sales and marketing contacts, technical support, and billing. However, call centers suffer from a variety of shortcomings.

For example, user calls to a call center are generally routed to a first available agent in order to respond to the customer's call in the shortest amount of time. In the event that a user contacts a call center again at a later date, the user is still routed to the first available agent. In general, different agents answer the user's calls and neither the user nor the agent develops a relationship with each other, as each call represents a first contact. As a result, opportunities for relationship building and loyalty development are lost.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to providing users of a network-based service with the opportunity to contact service agents and, in particular, to providing users of the network-based service with the option to contact a service agent that the user has previously contacted. Further aspects of the disclosure relate to facilitating communication between a service agent and a user when the service agent is off duty. Beneficially, by facilitating repeat contacts relationships may be developed between service agents and users, enabling service agents to provide improved service to users. Embodiments discussed below may refer to the users as customers and the service agents as customer service agents. However, it may be understood that users are not limited to customers but may include any users of network-based services.

In this regard, an agent continuity service is described that receives customer requests for contact with customer service agents (CSAs). For example, a customer using a customer computing device, such as a personal computer, may identify an item of interest presented by a network-based service and may desire to communicate with a CSA regarding the item of interest. This network-based service may be anything that provides a good, service, or information that is of interest to the customer. Accordingly, the network-based service may include network-based retailers such as those which sell items for purchase to the customer, network-based sources of entertainment and/or information (e.g., network-based encyclopedias, media sharing, etc.), network-based social networking services which enable users to share content with one another, and the like. In one embodiment, using his or her computing device, the customer may request contact with a CSA.

In one embodiment, the network-based retailer may provide a mechanism by which the customer may contact a CSA. Contacts may be conducted by communication mechanisms including, but not limited to, telephone, voice-over IP (VOIP), video conferencing, instant messaging (IM), short message service (SMS) text messaging, and other communications protocols known in the art. As described in greater detail below, when the customer employs a contact mechanism to contact a CSA, the agent continuity service may identify CSAs that have previously engaged in contact with the customer (if any) and determine the availability of such CSAs to contact the customer. The agent continuity service may further offer the customer the option to contact one or more of the identified CSAs, and, in response to a customer selection, distribute the contact to a CSA selected by the customer. It may be understood, however, that if a customer has not previously contacted a CSA, the agent continuity service may still provide the customer with the option to contact a first available CSA, as discussed in greater detail below.

For example, the network-based service may be a network-based retail service, implemented via a website, e.g., a website that sells consumer electronics. Using a personal computing device, the customer may identify an item of interest displayed for sale by the network-based retail service, for example, a personal computer. In addition to identifying the item of interest, the customer may also have one or more questions regarding purchase of the personal computer, such as the duration of manufacturer and extended warrantees. The network-based service may provide a telephone number for contacting the CSA. When the customer places a telephone call to the telephone number associated with the CSA, the call is routed through a telephone network to the agent continuity service.

In order to facilitate routing of the customer's contact to a customer service agent that has previously assisted the customer, the agent continuity service may identify the customer. In certain contact embodiments, the customer's request for contact with a CSA may already contain information that may be used to identify the customer. For example the agent continuity service may obtain a customer's telephone number, for example by a caller ID system, when the customer employs a contact mechanism employing a telephone (e.g., voice calls, SMS messages). In another embodiment, as discussed in greater detail below, the customer may request contact with a CSA through an interface provided by the network-based service. In such cases, the customer may already have provided identifying information (e.g., an e-mail address, a login, etc.) to gain access to the user interface.

In alternative contact embodiments, the customer's request for contact with the CSA may not contain information that identifies the customer and the agent continuity service may request identification information directly from the customer. The agent continuity service may employ mechanisms including, but not limited to, interactive voice response systems (IVR) may be employed to request information. For example, continuing the example above with the customer employing a telephone to contact a CSA, the agent continuity service may generate and transmit a user interface that enables the customer to provide selected information such as a name, e-mail address, username, etc. The customer may, in turn, provide information through use of their telephone keypad (e.g., dual-tone multi-frequency signaling (DTMF)), voice recognition, and the like). In either manner, the agent continuity service may obtain customer identification information.

Upon identifying the customer, the agent continuity service may identify CSAs with whom the customer has previously had contact. These prior CSAs may be identified from customer history records of the call center that distributes calls to the CSAs. The customer history records may maintain information including, but not limited to, the customer's name, purchases, queries, query resolutions, status of any unresolved matters, agents with whom the customer interacted with, dates of interactions, agent notes/comments, customer feedback received regarding any of the CSAs they interacted with, and any other information known in the art of customer relations management that may be relevant to the customer. From these records, the agent continuity service may extract the CSA information.

It may be recognized that a customer's history may include contacts with more than one CSA. In the event of multiple CSA contacts in the customer's history, it may be beneficial to prioritize which prior CSAs are selected for presentation to the customer (e.g., one or two of the highest priority CSAs). In one embodiment, parameters that may be used to prioritize the CSA presented to the customer may include, but are not limited to, availability of the CSA, if available, if available, the time duration until the CSA can be contacted by the customer, whether the customer has positively reviewed the CSA, the duration of time since the CSA has been in contact with the customer, how frequently and/or how many total times have the CSA and customer been in contact, and the like.

In this manner, the agent continuity service may select one or more of the previously contacted CSAs from the contact history of the customer and provide these selected CSAs to the customers as options in response to the customer's CSA contact request. Beneficially, the customer and CSA may develop a familiarity with each other that may help address queries and resolve problems more quickly as the two individuals know each other better. It may be understood, however, that the agent continuity service may also provide other CSA options in addition to those CSAs in the customer's contact history, such as a first available CSA.

Having identified one or more prior contacted CSAs for the customer, the agent continuity service may further determine the availability of these CSAs and transmit this information to the customer in response to their request for CSA contact. In one embodiment, availability may be determined by whether the CSA is on-duty or not. If a CSA is on duty, the CSA may be idle or engaged in contact with a customer. If the CSA is idle, the status of the CSA may be determined to be "Immediately Available." If the CSA is engaged with a customer, the CSA's status may be "Available with wait" where the agent continuity service may further estimate a wait time until the CSA is free to contact the customer.

If a CSA is off-duty, availability may be determined by the circumstances under which the CSA is off-duty. In cases where the CSA is off-duty for a short duration, such as scheduled break or restroom break (e.g., about five to fifteen minutes), the status of the CSA may also be designated as "Available with Wait" with the estimated time until the CSA is free given by the duration of time that the CSA is scheduled to be off-duty.

However, if the CSA is scheduled to be off-duty for an extended duration of time (e.g., greater than about fifteen minutes), the status of the CSA may be designated as "Unavailable." As discussed in greater detail below, under these circumstances, the customer may be asked if they would like to receive a call-back from the CSA. The customer may also be provided alternative CSAs such that, even if their first choice is unavailable, the customer may contact another CSA immediately or with a modest wait time.

In further embodiments, a CSA may agree to receive contacts during their personal time, when they are not on duty. Under these circumstances, a CSA may respond to customer contacts that are distributed from the agent continuity service just as the CSA would if they were on-duty. Thus, any of the above statuses may apply, just as if the CSA were on- or off-duty in a work environment.

For example, continuing the example of a customer calling to request a customer service agent, the agent continuity service may search a storage archive for the contact history of the customer. Assuming that the customer contact history indicates that the customer had spoken once with a CSA and had given this CSA a positive review, the agent continuity service may present this identified CSA as an option to the customer. Assuming that the agent continuity service further determines that the CSA is currently in contact with another customer, the status of the identified CSA is "Available with wait."

The "Available with wait" status means that the agent continuity service is prompted to estimate a wait time until the identified CSA is free. In a further example, the agent continuity service may determine that customer contacts, on average last a duration of approximately 10 minutes. The agent continuity service may further determine that the identified CSA has been in contact with their current customer for approximately five minutes (e.g., the current call is expected to last approximately five more minutes, on average). The agent continuity service may further determine, based on average, that a CSA becomes available every two minutes. Therefore, the agent continuity service may present the customer with the options of 1) waiting approximately five minutes for the identified CSA or 2) waiting approximately two minutes for the first available CSA by telephone.

The customer may make their CSA selection from the options presented by the agent continuity service. The customer's selection may be transmitted to the agent continuity service, which may process the selection and generate a user interface for the agent, including information regarding the customer. This customer information may include any information in the customer record that may be pertinent to the agent, including, but not limited to, the customer's name, purchases, queries, resolutions, status of any unresolved matters, agents with whom the customer interacted with, dates of interactions, agent notes/comments, customer feedback received regarding any of the CSAs they interacted with, and any other information known in the art of customer relations management that may be relevant to the customer.

The user interface may be forwarded to a computing device of the selected CSA, with the customer contact information. From his or her computing device, the CSA may review the user interface and initiate the contact with the customer. The customer and the CSA may subsequently communicate with each other as needed. When the contact is ended, the agent continuity service may request the customer to participate in a survey to review the contact and the CSA. The CSA may further record notes of the contact for future use.

Continuing the example above, the user may press numbers on their phone to select from various options for which agent option they would like to select. For example, the user may be presented with the option to press the number one on their phone to speak with the identified prior CSA in five minutes or to press the number two on their phone to speak with the first available CSA in thirty seconds. In certain embodiments, upon making their selection, the customer may be placed on hold until their selected CSA becomes available (e.g., wait times less than a selected time duration such as about 1-2 minutes). In other embodiments, upon making their selection the customer may be provided the option to be placed on hold or to receive a call back (e.g., wait times greater than a selected time duration, such as about 2 minutes).

Beneficially, in this manner, a customer is provided the option of contacting a CSA that they have previously contacted, should they desire. The ability to direct customers back to CSAs with which the customer has had positive experiences enables positive relationships to be developed. In contrast, traditional call center routing has focused primarily on speed of placing a customer in contact with a CSA. However, when customers are greeted by the same CSAs repeatedly, a degree of comfort and loyalty is developed that may assist in the query and problem resolution process.

Figure 1:
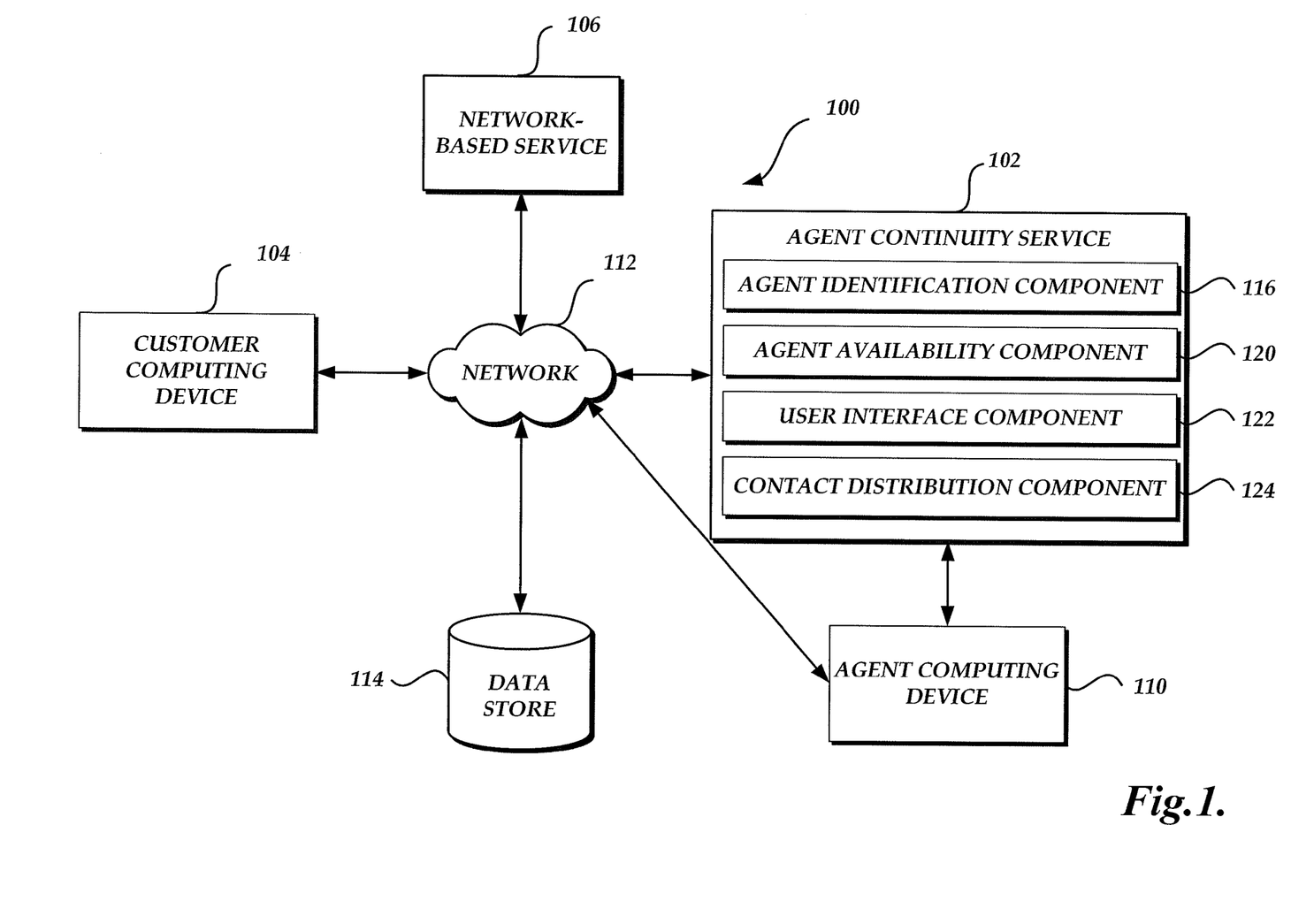
FIG. 1 is a schematic block diagram of an illustrative agent continuity service for managing contacts between customers and customer service agents.

With reference to FIG. 1, an embodiment of an operating environment 100 for distributing contacts from customers to customer service agents (CSAs) whom the customers have previously contacted is illustrated. In the operating environment 100, a customer may employ a customer computing device 104 to communicate with a network-based service implemented via a website 106. The network-based service 106 may maintain or generate one or more user interfaces capable of display by the customer computing device 106. Should the customer have a problem or query regarding information displayed in one or more of the user interfaces provided by the network-based service 106, the customer may employ his or her customer computing device 106 to request contact with a CSA employing his or her agent computing device 110.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components (including but not limited to virtual utility computing services, a.k.a. "cloud computing services") and peer-to-peer network configurations to implement at least a portion of the processes.

The agent continuity service 102 and network-based service 106 may each be embodied in a plurality of components, each executing an instance of the respective contact agent continuity service 102 or network-based service 106. A server or other computing component implementing the agent continuity service 102 and network-based service 106 may include a network interface, memory, processing unit, and computer readable medium drive, all of which may communicate which each other may way of a communication bus. The network interface may provide connectivity over the network 112 and/or other networks or computer systems. The processing unit may communicate to and from memory containing program instructions that the processing unit executes in order to operate the agent continuity service 102 and network-based service 106. The memory generally includes RAM, ROM, and/or other persistent and auxiliary memory.

Those skilled in the art will appreciate that the network 112 may be any wired network, wireless network or combination thereof. In addition, the network 112 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The customer computing device 104 and agent computing device 110 may comprise any communication device such as a PC, a kiosk, a thin client, a home computer, and a dedicated or embedded machine. Further examples may include laptop or tablet computers, personal computers, personal digital assistants (PDAs), hybrid PDAs/mobile phones, mobile phones, electronic book readers, set-top boxes, and the like. It may be understood that reference to contact by customers and/or agents or customer service agents (CSAs) may be performed by customer computing device 104 and/or agent computing device 110.

With further reference to FIG. 1, illustrative components of the agent continuity service 102 will now be addressed. In an embodiment, the agent continuity service includes an agent identification component 116 for receiving a contact request from a customer for contact with a CSA to place the customer in contact with an available CSA.

In response to receiving the contact request from the customer client device 104, the agent identification component 116 may determine whether the customer has been identified by the contact request. Contact requests may take any form, depending upon the type of communication mechanisms that are provided to contact the CSA. In one embodiment, a customer may call a CSA using a traditional POTS or voice-over-IP (VOIP) service. In another embodiment, a customer may employ a messaging service, such as instant messaging, text messaging, and electronic mail, to contact the CSA. In another embodiment, a customer may employ video conferencing to contact the CSA. In a further embodiment, the customer may contact the CSA through a website (e.g., the network-based service 106). Examples of such a contact may be found in U.S. patent application Ser. No. 12/547,370, filed on Aug. 25, 2009, entitled, "SYSTEMS AND METHODS FOR CUSTOMER CONTACT" and U.S. patent application Ser. No. 12/547,387, filed on Aug. 25, 2009, entitled, "SYSTEMS AND METHODS FOR CUSTOMER CONTACT," the entirety of each of which is hereby incorporated by reference in their entirety.

Selected forms of contact requests may contain customer identification information or may contain information that may be used to infer the customer's identity. In an embodiment, customer contact information may include, but is not limited to, the customer's name, e-mail address or other unique information associated with this information such as a username/password to a network-based resource (e.g., the network-based service 106).

In one example, telephone services, such as POTS and SMS messaging are conducted from a telephone having a fixed telephone number associated with a customer account. If this telephone number is not blocked, a caller ID system may be employed to determine the customer's identity. In another example, when employing the network-based service 106 to contact the CSA, as described in the above referenced Ser. Nos. 12/547,370 and 12/547,387 patent applications, the customer may input identifying information such as a name, username/password, e-mail address, or other information that identifies the customer to the network-based service 106. In this case, the contact request may include the customer's identity as known by the network-based service 106.

Other forms of the contact request may not contain customer identification information. For example, if the customer employs POTS to transmit their contact request and their telephone number is blocked. In another example, if the customer employs a VOIP service or video messaging, or instant messaging it may be very difficult to associate a network address with the customer's identity. In these cases, the agent identification component 116 may request customer identification information from the customer.

The agent identification component 116 may request customer identification information from the customer by communicating with a user interface component 122 of the agent continuity service 102. The user interface component 120, at the request of the agent identification component 116, may generate (and optionally transmit) a user interface to the customer that requests identification information from the customer. For contact mechanisms employing a POTS service, VOIP service, or video messaging, the customer may be prompted by audio to enter their customer identification information on their telephone or computer interface by speaking into their phone or computer. For contact mechanisms employing SMS messaging or instant messaging, the customer may be instructed to type out their customer identification information.

Upon determining the customer's identification, the agent identification component 116 may communicate with one or more data stores, represented by data store 114, to obtain customer contact histories. It may be understood that data store 114 may include network-based storage capable of communicating with any component of the system 100 via network 112. The data store 114 may further include storage that is in local communication with any component of the system 100.

Upon retrieval of the customer contact history from the data store 114, the agent identification component 116 may parse the customer contact history to identify any prior CSA contacts conducted by the customer. The customer history may maintain information including, but not limited to, the customer's name, purchases, queries, query resolutions, status of any unresolved matters, CSAs with whom the customer has interacted, dates of interactions, agent notes/comments, customer feedback received regarding any of the CSAs they interacted with, and any other information known in the art of customer relations management that may be relevant to the customer.

Should there be more than one CSA contact in the customer's history, the agent identification component 116 may further prioritize the prior CSA contacts. In one embodiment, prior CSA contacts may be prioritized on the basis of customer feedback. In general, customer feedback may be characterized as positive or negative. It may be considered counterproductive to attempt to foster relationships between customers and CSAs where the customer has given the CSA a negative review. Therefore, in one embodiment, the agent identification component 116 may ignore prior CSA contacts having negative or poor customer reviews.

In another embodiment, prior CSA contacts may be prioritized on the basis of chronology. Prior CSA contacts that are relatively most recent are likely to be the ones that are most fresh in the customer's mind and, therefore, may also be the contacts that have a good likelihood of succeeding in developing a productive relationship between the CSAs and customer. Therefore, in another embodiment, the agent identification component 116 may prioritize a selected number of the most recent CSA contacts (e.g. one to three).

In a further embodiment, prior CSA contacts may be prioritized on the basis of frequency. CSAs that have already been contacted more than once by the customer reflect CSA-customer relationships that are in development and, therefore may also be contacts that have a good likelihood of succeeding in developing a productive relationship between the CSA and customer. Therefore, in another embodiment, the agent identification component 116 may prioritize CSAs that have greater than a selected number of prior contacts with the customer (e.g. greater than one).

It may be understood that any combination of the above prioritization concepts may be employed to select one or more CSAs for presentation to the customer without limit. For example, the agent identification component 116 may select the CSA that is the most recent CSA to contact the customer which has received a positive review. In another embodiment, the agent identification component 116 may select the CSA that has contacted the customer the most number of times, irrespective of reviews or duration of time since last contact.

Having identified prospective CSAs for presentation to the customer, the agent identification component 116 may transmit these prospective CSAs to an agent availability component 120 of the agent continuity service 102. The agent availability component is configured to determine the availability of the identified, prospective CSAs. In one embodiment, a real-time availability of the CSAs may be determined by the agent availability component 120 through communication with the CSAs. For example, to signal availability to the agent availability component 120, a CSA may press a key or select a user interface control from his or her agent computing device. If no customer is waiting for service, the CSA may maintain this silent-open (i.e., "off-the-hook") connection to the system to indicate continued availability. In this case, the CSA's availability may be considered to be, "Immediately Available."

Should a customer contact be received by the CSA, the CSA may employ a user interface object of his or her agent computing device 110 to answer the contact. When this transition occurs, CSA is still considered to be available, as they are on duty but the CSA is not immediately available, as they are busy handling another contact. Measurements of the durations of contacts may be recorded by the CSAs and transmitted the to the data store 114 for storage and analysis. In particular, analysis may be performed by one or more components of the system 100 (e.g., contact distribution component 124) to determine the average contact length. This average contact length, in one embodiment, may be used to estimate the duration of a contact. Thus, when the CSA takes a call, the CSA's status may be reported as, "Available with wait," with a reported wait time approximately equal to the estimated average contact length.

In cases where the CSA becomes unavailable, the CSA may simply hang up the phone. The severed connection may signal to the agent availability component 120 that a CSA is indicating that he or she is no longer available to take a customer contact (or that a CSA has been unintentionally cut off from the system, due to, for instance, a fault in the network).

In certain embodiments, short durations of unavailability of a CSA, for example, to take a restroom or coffee break (e.g., durations of approximately five to fifteen minutes) may optionally be reported as "Available with wait," with the wait time being the scheduled time of unavailability. In other embodiments, where the duration of time is anticipated to be long (e.g., a meal time break, end of shift, etc.) this time may be indicated as "Unavailable."

In alternative embodiments, CSAs may arrange to make themselves available to receive contacts when away from their call center. For example, the CSA may have configured a telephony and/or computing setup at a selected location (e.g., their home) that enables the CSA to have contacts and customer information directed to this location. As a result, even though away from their call center, a CSA may be indicated as "Immediately Available" or "Available with wait."

In this manner, the availability of the prospective CSAs identified above may be determined for presentation to the customer agent availability component 120. For each prospective CSA, their availability may be determined according to: "Available immediately," "Available with wait" and the estimated wait time, or unavailable. The customer agent availability component 120 may also determine the availability of the first available CSA as well.

Figure 4:
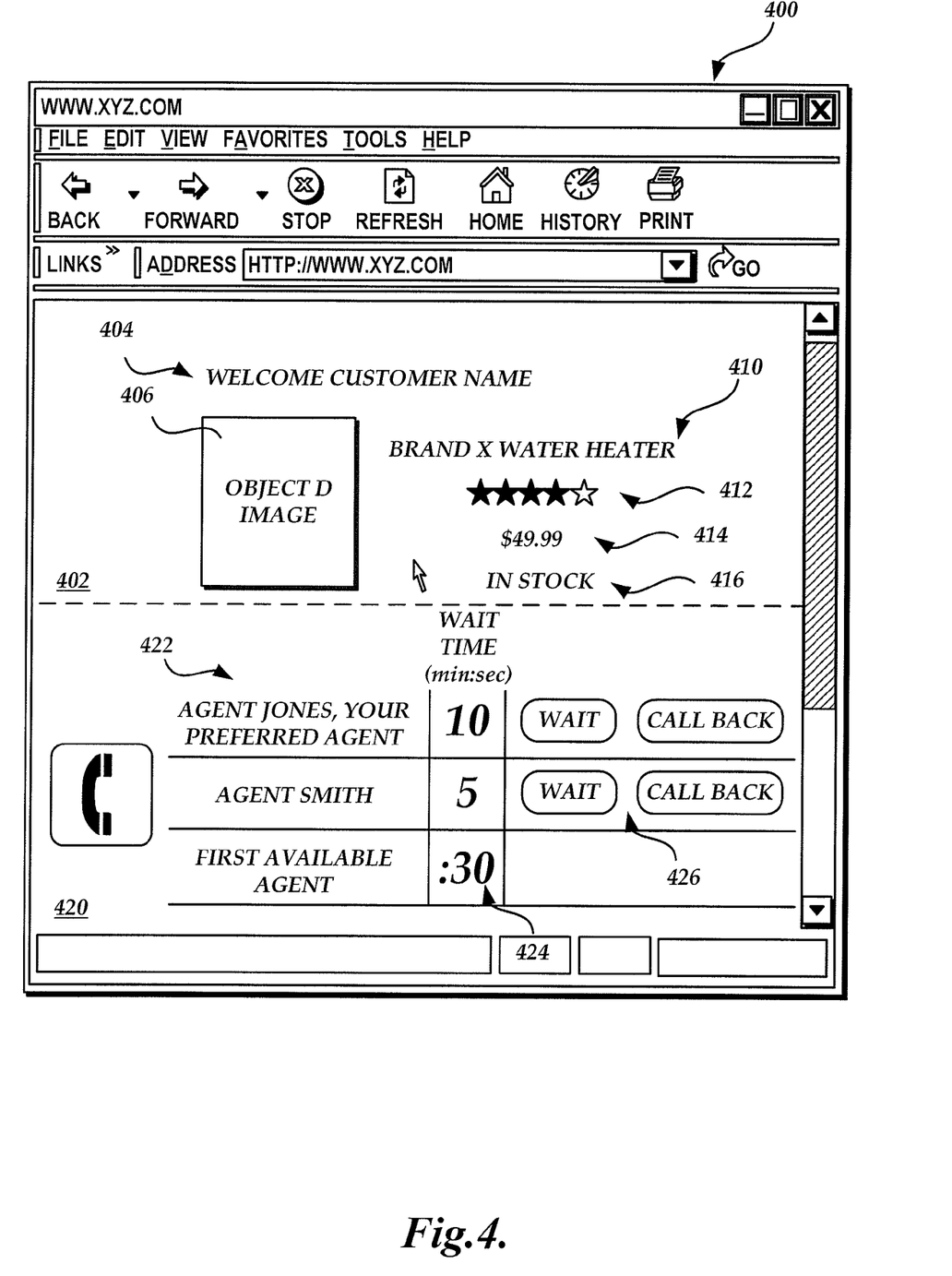
FIG. 4 is an illustrative user interface for display on the customer's computing device that illustrates the status of one or more customer service agents.

The user interface component 122 may generate a user interface containing this information at the request of the agent availability component 120, as discussed in greater detail with respect to FIG. 4 below. One of the customer agent availability component 120 and user interface component 122 may transmit this user interface to the customer for selection.

The selection of the CSA may be received by the contact distribution component 124. The contact distribution component 116 may be in communication with one or more of the CSAs, as represented by the agent computing device 110. The contact distribution component 116 may enable communication between the customers and the CSAs using their respective customer computing devices 104 and agent computing devices 110 through the network 112. Embodiments of the contact distribution component 116 may be found in U.S. patent application Ser. No. 12/192,067, entitled, "SYSTEM AND METHOD FOR AUTOMATED CALL DISTRIBUTION," filed Aug. 14, 2008 and U.S. patent application Ser. No. 12/192,064, entitled, "INDEPENDENT CUSTOMER SERVICE AGENTS," filed Aug. 14, 2008, the entirety of each of which are hereby incorporated by reference.

Upon completion of the contact between the CSA and the customer, the user interface component 122 may transmit a user interface to the customer requesting feedback regarding the CSA's performed during the just completed contact. Should the customer provide feedback, the feedback may be stored in the data store 114 for review and analysis. The CSA may further generate notes and comments regarding the call that are stored as part of the customer's contact history in the data store.

Figure 2:
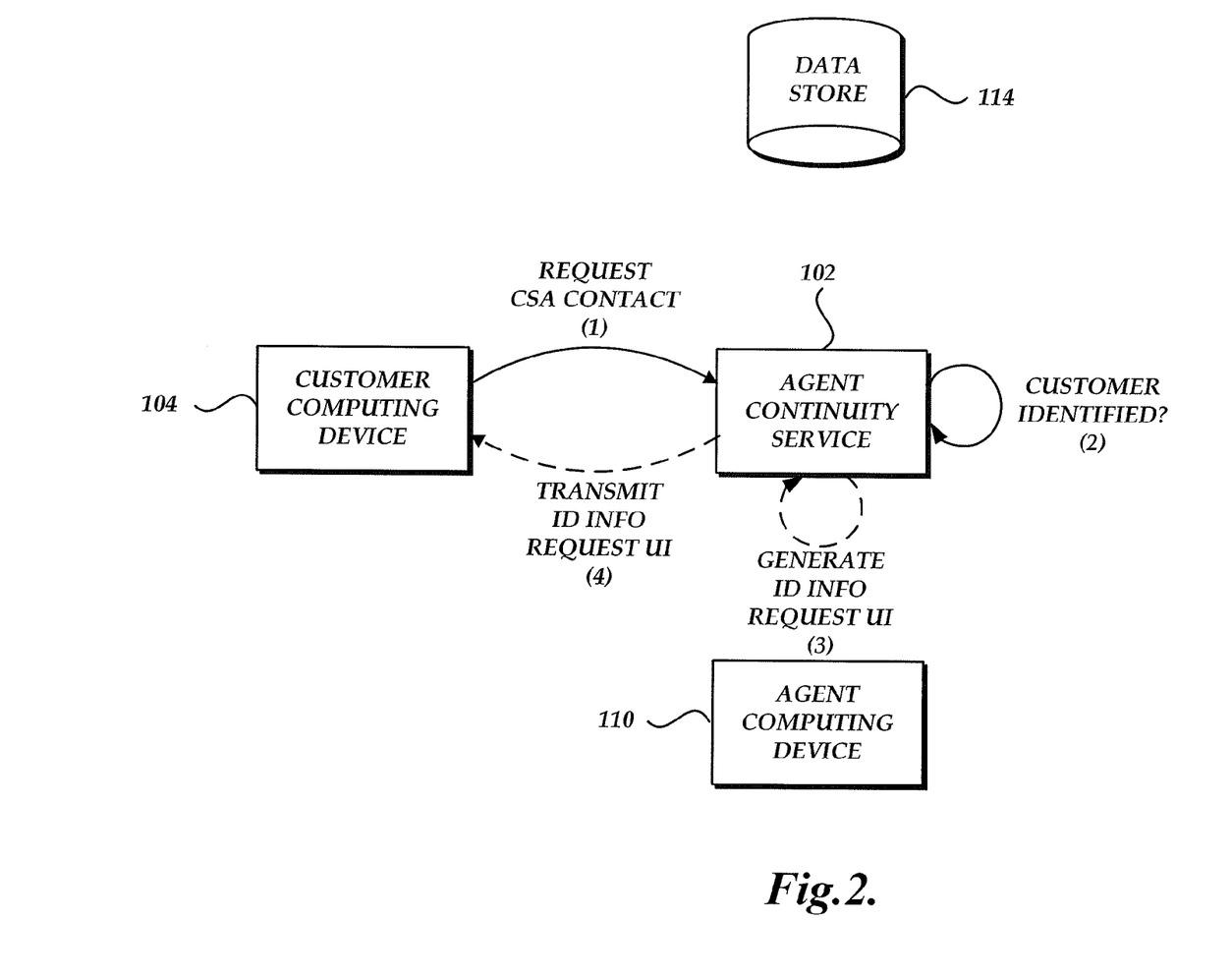
FIG. 2 is a block diagram of the operating environment of FIG. 1, illustrating the agent continuity service identifying a customer of a network-based service that requests contact with a customer service agent.

FIG. 2 is a block diagram of the operating environment of FIG. 1, illustrating a customer contact request submitted to the agent continuity service 102. As depicted in FIG. 2, the agent continuity service 102 may review the CSA contact request to determine if the request contains information that may identify the customer. If the request does not contain information identifying the customer, the agent continuity service 102 may generate and transmit a user interface to the customer. This user interface requests the customer provide identifying information and enables the identification information to be submitted to the agent continuity service 102.

Figure 3:
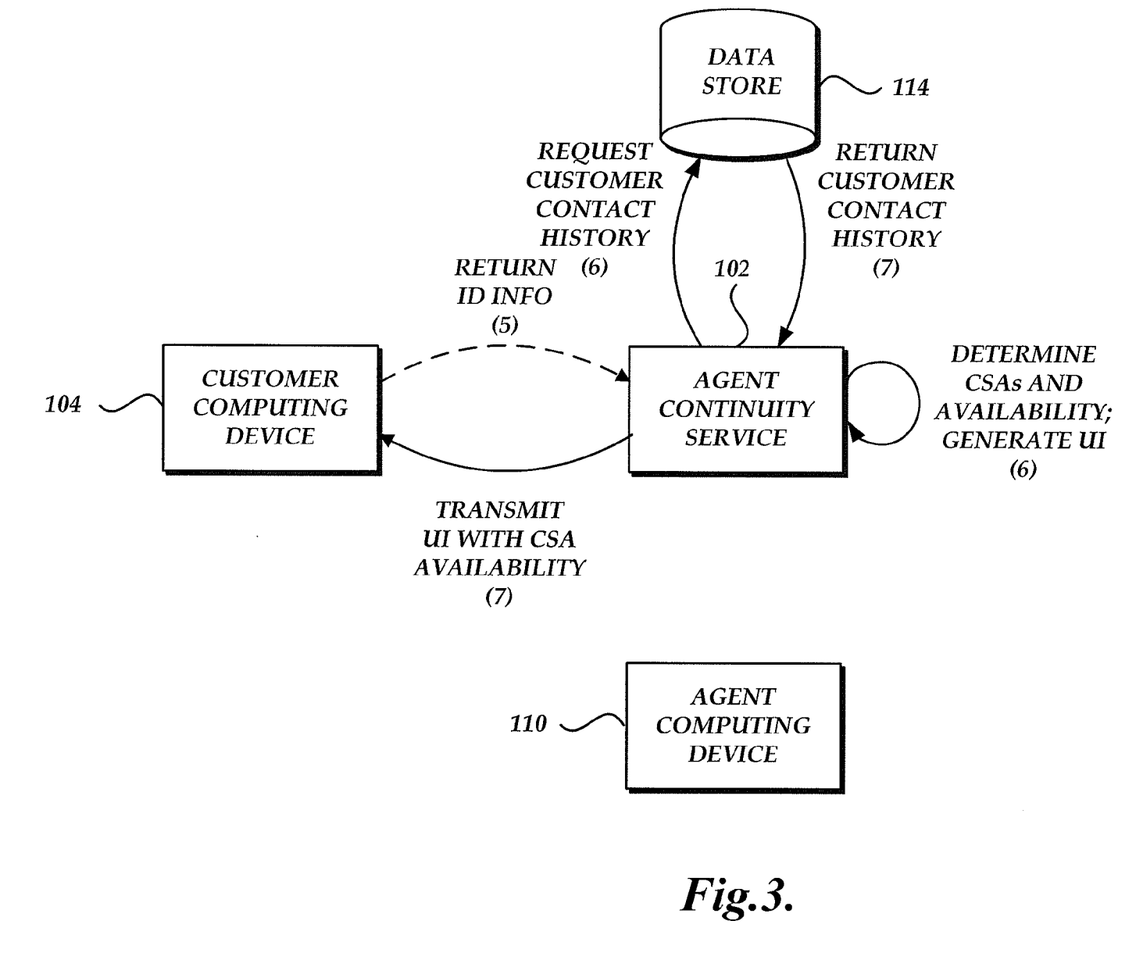
FIG. 3 is a block diagram of the operating environment of FIG. 1, illustrating the agent continuity service transmitting prospective customer service agent choices to the customer in response to their contact request.

FIG. 3 is a block diagram of the operating environment of FIG. 1, illustrating the agent continuity service 102 determining CSAs that have been previously contacted by the customer and their availability. Upon receiving the user interface requesting identifying information, the customer may enter their identifying information and return this information to the agent continuity service 102 via the user interface.

Having received the customer identifying information, the agent continuity service 102 may submit a request to the data store 114 for the customer's contact history. The request for the customer's contact history may include the customer identification information (e.g., the customer's name, e-mail address, etc.). The data store 114 may return at least a portion of the customer's contact history, including information regarding CSAs that the customer has previously contacted.

One or more of the identified CSAs may be prioritized by the agent continuity service 102. As discussed above, in one embodiment, CSAs that have received negative or poor reviews from the customer may be omitted from further consideration. In another embodiment, the most recently contacted CSA may be prioritized. In a further embodiment, the most frequently contacted CSA may be prioritized. In selected embodiments, the most recently contacted CSA that has received a positive review from the customer may be prioritized.

The availability of one or more of the CSAs identified in the customer's contact history (e.g., the prioritized CSAs) may be determined by the agent continuity service 102. In one embodiment, the agent continuity service 102 may monitor the real-time status of the CSAs in communication with agent continuity service 102. From this availability information, status indicators of "Immediately available," "Available with wait" and a wait time, and "Unavailable" may be assigned to selected ones of the identified CSAs.

A user interface 400 may be further generated by the agent continuity service 102 for presentation to the customer. With reference to FIG. 4, FIG. 4 illustrates one embodiment of a user interface 400 that is configured for display on the customer computing device 104. The user interface 400 includes an item of interest offered for sale by the network-based service 106 in a first window 402 that is the subject of the customer's contact and CSA availability information in a second window 420. The user interface 400 may further include biographical information 404 regarding the customer, such as the customer name. The user interface 400 may further include an image 406 of the item of interest (i.e., object D), as well as additional purchase details regarding the object that are available from the network-based service 106. For example, the purchase details may include a name of the object 410, a price 412, a rating 414, a description, and an indication 416 of available inventory for the item of interest. Those skilled in the art will recognize that the purchase details depicted in FIG. 4 are illustrative and that additional or different purchase details may be included in the user interface 400.

The CSA availability window 420 may include a list of CSAs that includes CSAs the customer has previously contacted. A "first available agent" is also provided as a default. Associated with each agent is also a wait time 424 and selection options 426. The wait time 426 may represent the best estimate of the agent continuity service 102 regarding the time until the associated agent is free to contact the customer. The selection options 426 represent the options from which the customer may choose should the customer desire to contact a CSA.

The first CSA listed in the CSA availability window 420 is a CSA referred to as "Agent Jones, your preferred agent." This first CSA listing may represent the CSA that is most highly prioritized, based upon prioritization criteria discussed above. For example, Agent Jones may be a CSA who has contacted the customer most recently and received a positive review. In contrast, Agent Jones may have contacted the customer less recently and/or received no review from the customer. Notably, however, the more highly prioritized CSA exhibits a wait time of about ten minutes, while the CSA "Agent Smith," whom the customer has also previously contacted, exhibits a wait time of about five minutes. Furthermore, the first available agent exhibits a wait time that is even lower at about thirty seconds.

The customer is faced with a choice. They may choose to wait a longer period of time to speak with the CSA deemed to be their preferred agent or a lesser period of time to speak with either a less preferred CSA or a first available CSA selected at random. The customer may further choose to receive a return contact from a selected CSA when the CSA becomes available. In such a case, as discussed in greater detail in U.S. patent application Ser. Nos. 12/547,370 and 12/547,387, the customer may provide contact information, such as a phone number, where they may be reached for return contact. The return contact may be provided by the CSA when the CSA becomes available or at a time selected by the customer.

Figure 5:
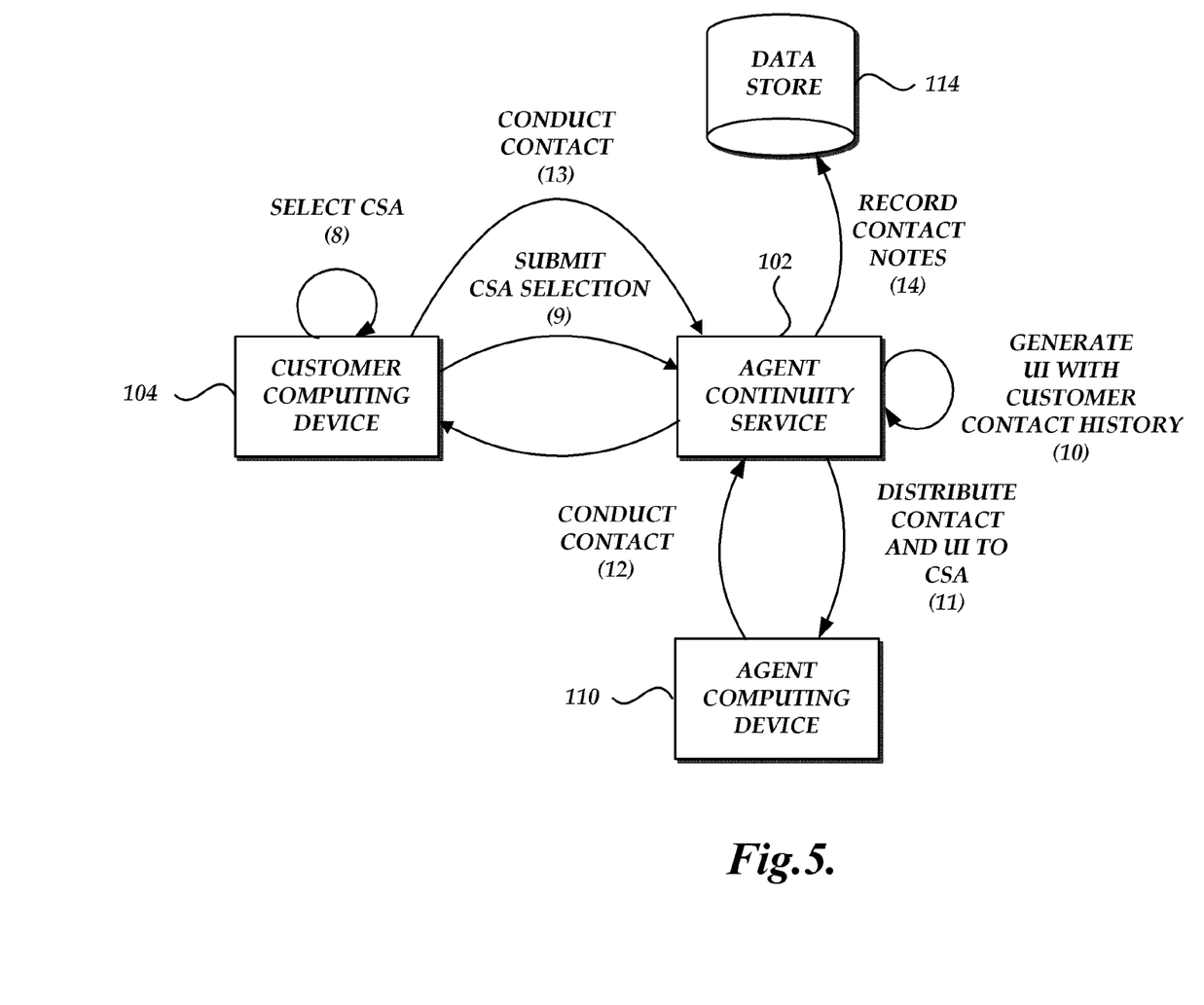
FIG. 5 is a block diagram of the operating environment of FIG. 1, illustrating a customer service agent, selected by the customer, initiating contact with the customer.

FIG. 5 is a block diagram of the operating environment of FIG. 1, illustrating the agent continuity service 102 bringing the customer into contact with their selected customer service agent. After selection of the CSA, the CSA selection may be submitted to the agent continuity service 102. The customer contact may be transmitted to the selected CSA along with an agent user interface 600. The agent user interface 600 may generated by the agent continuity service 102 for the selected CSA and may be personalized based upon the customer.

Figure 6:
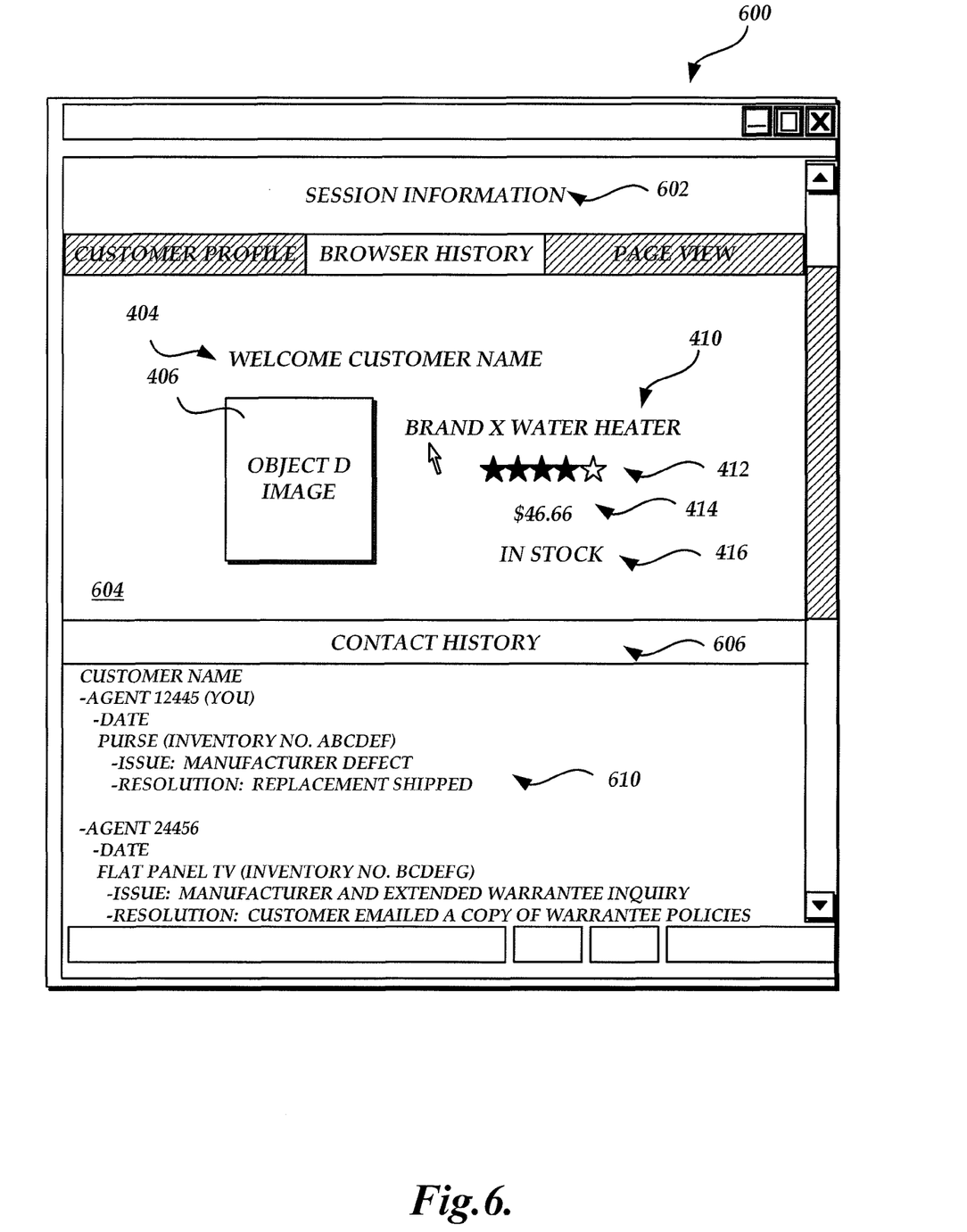
FIG. 6 is an illustrative user interface for display on an agent computing device that enables the agent to review information including prior contacts by the customer.

FIG. 6 presents an illustrative agent user interface 600 which may be presented to the CSA with the customer contact. In an embodiment, the user interface 600 may include a session information window 602 and a contact status window 606. The session information window 606 may include information regarding the customer, including a customer profile, browser history, and a page view. The customer profile may include any information regarding the customer which may help the CSA in their contact with the customer. Examples of the customer profile may include, but are not limited to, customer biographical information (e.g., name, age, location, etc) and history with the network-based service 106 (e.g., browse history, purchase history, etc.) or contact distribution service (e.g., contact history). The browse history may include items which the customer had browsed on the network-based service 106 within a selected duration of time from the contact (e.g., one day, one week, one month, etc.). An illustrative page view 604 of the user interface 600, illustrated in FIG. 6, may include the view of the item of interest that is the subject of the customer's contact. For example, the page view 604 may include biographical information 404, image 406 of item of interest, a name of the object 410, a price 412, a rating 414, a description, and an indication 416 of available inventory for the item of interest, as discussed above with respect to FIG. 4.

The contact history window 606 may include pertinent details regarding prior contacts of the customer for use by the CSA. For example, the illustrated contact history 606 presents two contacts, a first contact with the instant CSA and a second contact with a different CSA. The first contact regarded a purse that exhibited a manufacturer defect. The customer contacted the CSA to discuss the defect and the matter was resolved by shipment of a replacement purse. The second contact was in regards to a question about manufacturer and extended warrantees for a flat panel television. The matter was resolved by the CSA emailing the customer a copy of the respective manufacturer and network-based retailer extended warrantee information.

After receiving the customer contact from the agent continuity service 102, the agent may initiate contact with the customer. Contact with the customer may continue until the customer's issue is resolved. Through use of the agent user interface, the CSA may better remember prior issues addressed with the customer as well as other details about the customer. These in turn may facilitate good customer relations and problem solving with the customer. Following termination of the contact, the CSA may record notes and/or comments regarding the contact in the customer contact history that are stored in the data store 114.

Optionally, the agent continuity service 102 may further generate and transmit a user interface to the customer that solicits feedback from the customer. Should the customer respond, the customer feedback may be associated with the CSA and the contact and stored in the data store for subsequent review and/or analysis.

Figure 7:
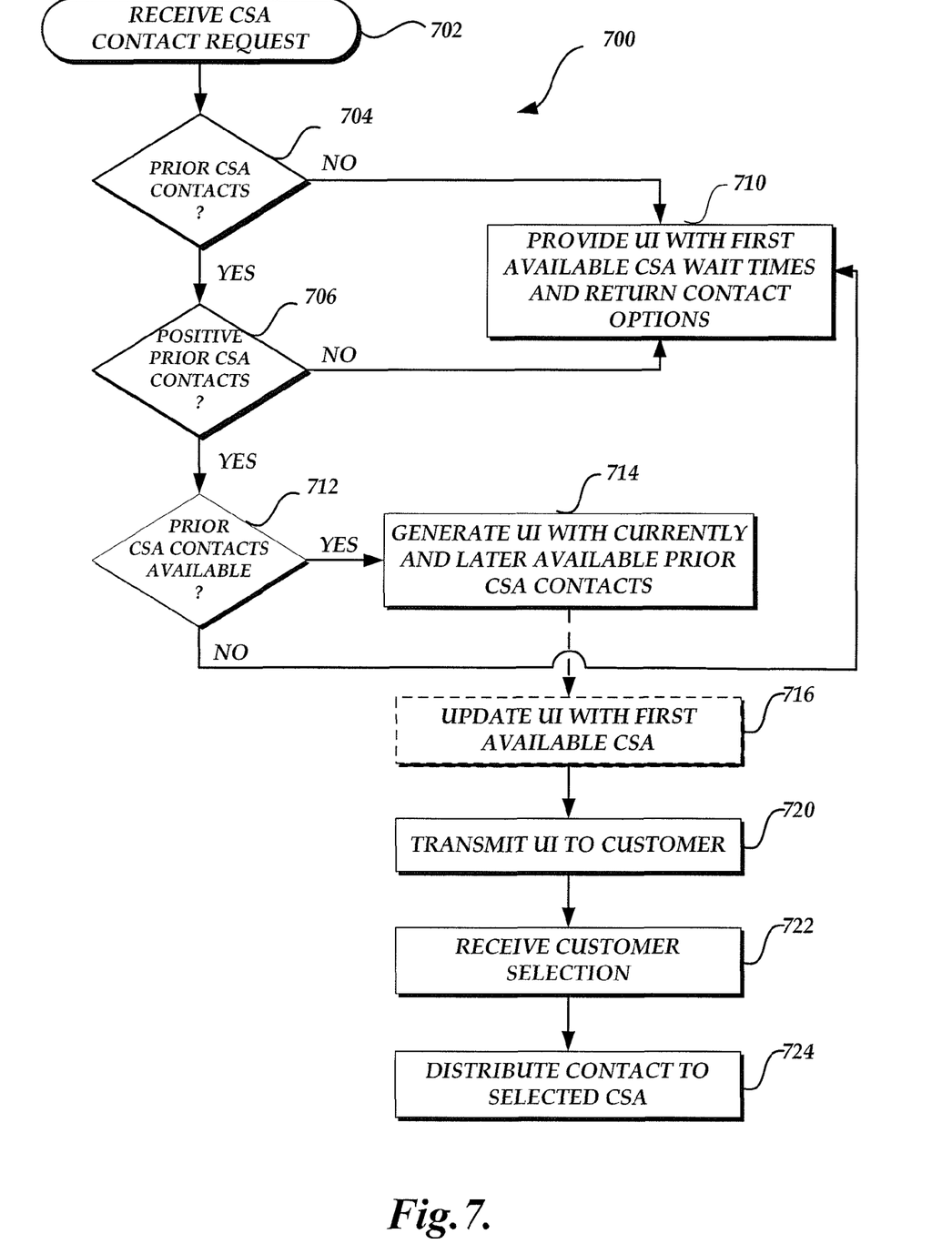
FIG. 7 is a flow diagram of an illustrative routine implemented by the agent continuity service to select a customer service agent that has previously been in contact with a customer.

FIG. 700 is a flow diagram of an illustrative routine 700 implemented by the agent continuity service 102 to enable customers to contact CSAs that they have previously contacted. The routine 700 begins in block 702 where a CSA contact request is received by the agent continuity service 102.

The routine proceeds to decision block 704 where a determination is made whether the customer has made any prior CSA contacts. If the customer has not made any prior CSA contacts, the routine 700 may move to block 710, where a user interface is provided to the customer in which one or more first available CSAs are provided to the customer with wait times and/or return contact options (e.g., a call back). If the customer has made prior CSA contacts, the routine 700 may move to decision block 706.

In decision block 706, the agent continuity service 102 may determine whether any of the prior CSA contacts have received positive prior reviews. If the customer has not received any prior positive CSA reviews, the routine 700 may move to block 710, where a user interface is provided to the customer in which one or more first available CSAs are provided to the customer with wait times and/or return contact options (e.g., a call back). If the customer has received prior positive reviews, the routine 700 may move to decision block 712.

In decision block 712, the agent continuity service 102 may determine whether the positively reviewed prior CSA contacts are available. If none of the positively reviewed prior CSA contacts are available (e.g., all are unavailable), the routine 700 may move to block 710, where a user interface is provided to the customer in which one or more first available CSAs are provided to the customer with wait times and/or return contact options (e.g., a call back). If at least one of the positively reviewed prior CSA contacts is available (e.g., Currently available or Available with wait time, the routine 700 may move to decision block 714, where a user interface is generated that includes the CSA and its availability information.

The routine 700 may optionally proceed to block 716, where the user interface may further be updated with the first available user interface. This first available user interface may be provided to the customer as an option, should the customer not desire further contact with one of the prior contacted CSAs.

The routine may additionally proceed to blocks 720-724. In block 720, the user interface may be transmitted to the customer. In block 722, the agent continuity service 102 may receive a CSA selection from the customer. In block 724, the CSA selected by the customer may receive the customer contact and proceed to contact the customer.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable storage medium having computer-executable components, the computer-executable components comprising:
   an agent identification component, the agent identification component operative to:
      receive a request for contact with an agent from a customer;
      determine an identity of the customer; and
      identify at least one agent that has previously participated in a prior contact with the customer and that has received a positive review based on the prior contact with the customer;
   an agent availability component, the agent availability component operative to:
      determine an availability of the at least one identified agent to contact the customer;
      identify an available agent that is available to contact the customer; and
      transmit a user interface including the at least one identified agent, the available agent, and the agents' respective availabilities to the customer, wherein the user interface is configured to enable the customer to select one of the at least one identified agent or the available agent for contact; and
   a contact distribution system, the contact distribution system configured to:
      receive an agent selection identifying a selected agent after the agent availability component transmits the transmitted user interface; and
      route the contact between the customer and the selected agent.

2. The non-transitory computer-readable storage medium of claim 1, wherein the contact comprises one or more of a telephone call, an electronic mail message, a voice-over IP (VOIP) communication, a video conference, an instant message (IM), or a short message service (SMS) text message.

3. The non-transitory computer-readable storage medium of claim 1, wherein the availability of an agent comprises one of "Immediately Available," "Available with wait," or "Unavailable".

4. The non-transitory computer-readable storage medium of claim 1, wherein the transmitted user interface enables the customer to wait for contact with the selected agent or request that the selected agent contact the customer at a later date.

5. A system comprising:
   a data store operative to store a record of contacts between a first person and one or more second persons; and
   a computing device in communication with the data store, wherein the computing device is operative to:
      obtain a record of contacts associated with the first person, wherein the record of contacts identifies one or more second persons with whom the first person has previously had contact;
      identify, from the one or more second persons, a second person that has received a positive review based on a prior contact with the first person;
      determine an availability of the second person for contact with the first person;
      identify an available person that is available to contact the first person;
      transmit the availability of the second person and the availability of the available person to the first person;

receive a selection identifying one of the second person or the available person to participate in a contact with the first person; and route the contact between the first person and either the second person or the available person in response to the selection.

6. The system of claim 5, wherein the computing device is further operative to select the second person by selecting a second person that has been in contact with the first person more recently than others of the one or more second persons.

7. The system of claim 5, wherein the availability of the second person comprises one of "Immediately Available," "Available with wait," or "Unavailable".

8. The system of claim 7, wherein the availability of the second person further includes an estimated wait time.

9. The system of claim 5, wherein the computing device is further operative to identify the first person by inferring the identity of the first person from a contact request.

10. The system of claim 5, wherein the computing device is further operative to verify the identified second person based upon a response received from a user interface provided with the transmitted availability.

11. The system of claim 5, wherein the contact comprises one or more of a telephone call, an electronic mail message, a voice-over IP (VOIP) communication, a video conference, an instant message (IM), or a short message service (SMS) text message.

12. A computer-implemented method of routing a contact between a first person and a second person, the method comprising:

under control of one or more configured computer systems:

identifying a second person that has previously participated in a prior contact with a first person and that has received a positive review based on the prior contact with the first person;

determining an availability of the second person to contact the first person;

identifying an available person that is available to contact the first person;

generating a user interface including the availability of the second person and the availability of the available person;

receiving a selection indicating whether the first person has an interest to contact the second person or the available person; and placing the first person into contact with either the second person or the available person based upon the selection.

13. The computer-implemented method of claim 12, wherein the availability of the second person to contact the first person comprises one of "Immediately Available," "Available with wait," or "Unavailable".

14. The computer-implemented method of claim 13, wherein the availability of the second person further includes an estimated wait time.

15. The computer-implemented method of claim 12, wherein the user interface further enables the first person to wait to contact the second person or request that the second person contact the first person at a later date.

16. The computer-implemented method of claim 12, wherein the contact comprises one or more of a telephone call, an electronic mail message, a voice-over IP (VOIP) communication, a video conference, an instant message (IM), or a short message service (SMS) text message.

17. A non-transitory computer-readable storage medium having computer-executable components, the computer-executable components configured to cause a hardware processor to:

obtain a record of contacts associated with a first person, wherein the record of contacts identifies one or more second persons with whom the first person has previously had contact;

identify, from the one or more second persons, a second person that has received a positive review based on a prior contact with the first person;

determine an availability of the second person for contact with the first person;

identify an available person that is available to contact the first person;

transmit the availability of the second person and the availability of the available person to the first person;

receive a selection identifying one of the second person or the available person to participate in a contact with the first person; and route the contact between the first person and either the second person or the available person based upon the selection.

18. The non-transitory computer-readable storage medium of claim 17, wherein the computer-executable components configured to cause the hardware processor to identify a second person comprise computer-executable components configured to cause the hardware processor to select at least one second person by identifying a second person that has been in contact with the first person more recently than others of the one or more second persons.

19. The non-transitory computer-readable storage medium of claim 17, wherein the availability of the second person comprises one of "Immediately Available," "Available with wait," or "Unavailable".

20. The non-transitory computer-readable storage medium of claim 17, further comprising computer-executable components configured to cause the hardware processor to identify the first person by inferring an identity of the first person from a contact request.

\* \* \* \* \*